O. A. CRAIN.
Cultivator.
No. 215,885. Patented May 27, 1879.
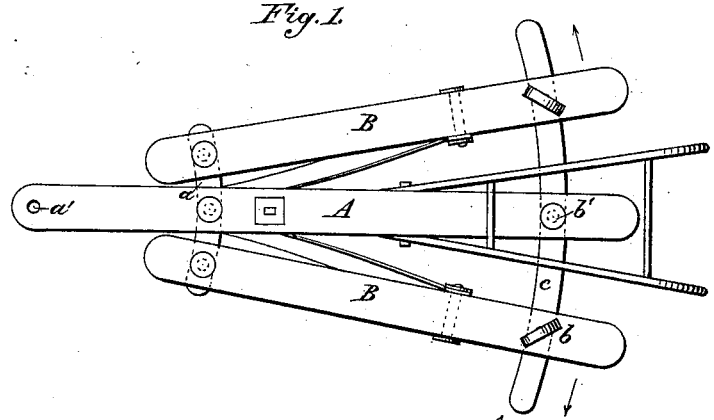
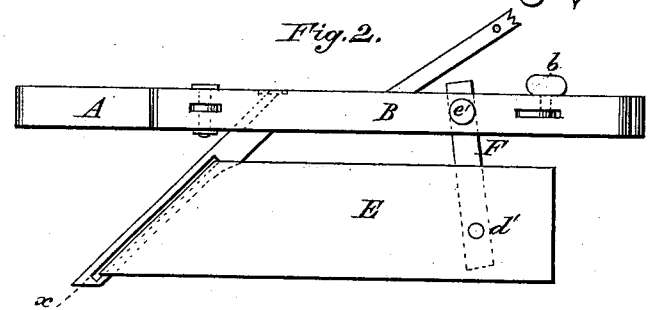
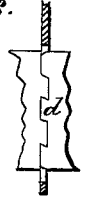
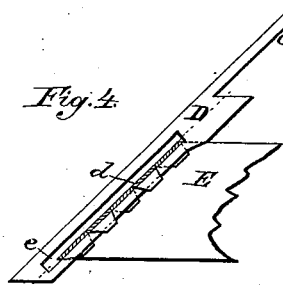

UNITED STATES PATENT OFFICE.

OSRO A. CRAIN, OF EVANSTON, ILLINOIS.

IMPROVEMENT IN CULTIVATORS.

Specification forming part of Letters Patent No. 215,885, dated May 27, 1879; application filed April 21, 1879.

*To all whom it may concern:*

Be it known that I, OSRO A. CRAIN, of Evanston, in the county of Cook and State of Illinois, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improvement in that class of cultivating implements having a double mold-board, and usually denominated "shovel-plows," the object being to overcome the difficulty experienced heretofore in forming a hinge-joint at the junction or apex of the two mold-boards that should be perfectly flexible, admitting of any desired adjustment, and at the same time strong, and so covered by the cutting-edge or colter of the plow as to be protected from injury by contact with roots, stones, or other obstructions commonly found in cultivated lands; and the invention consists in a peculiarly-formed colter, to which the mold-boards are hinged, and the devices for securing and adjusting the latter, as will be hereinafter fully described.

In the drawings, Figure 1 is a plan or top view, showing the frame to which the mold-boards are attached and the arrangement of the adjusting devices. Fig. 2 is a side view, showing the relative positions of the mold-boards and frame. Fig. 3 is a section of the colter on the line $x$ of Fig. 2, giving a front view of the hinge-joint which connects the mold-boards to the colter and to each other. Fig. 4 is a side view of the colter with a portion of the mold-boards attached, and fully illustrates the method of forming the hinge-joint by which they are connected.

The frame of this plow is formed of a center piece or beam, A, running the whole length of the implement, and provided at its front end with means for attaching draft devices, and also having firmly secured to it the handles, by which the implement is guided. Passing through a mortise in this center piece is the cross-bar $a$, to each end of which is pivoted one of the side pieces, B. Another cross-bar, $c$, curved to the radius $a' b'$, passes through a mortise in the rear part of the center piece, A, being firmly secured therein by a bolt at $b'$, and having its two extremities passed through mortises in the side pieces, B, which are secured in any desired position upon the cross-bar by the bolts or set-screws $b$. It will, therefore, be apparent that the width of the rear end of the frame may be increased or diminished at pleasure, so as to cause the implement to cut a wide or narrow furrow.

The colter D is provided at its upper end with a shank, $c'$, which passes through the center piece or beam, A, in a diagonal direction, and is firmly secured thereto by any suitable means. That part of this colter below the beam is provided with an elongated slot, $e$, the portion behind the slot being rounded, and forming the pintle of the hinge $d$, upon which the mold-boards E turn. The mold-boards are constructed preferably of sheet-steel; but other suitable material may be used, if desired. They are formed to throw the earth from them, in the ordinary manner, and their forward ends are shaped to interlock and inclose the pintle of the colter in a manner similar to that of the two parts of a door-hinge, thus forming the hinge $d$, by which the flexible connection between the colter and mold-boards is made. It will be further observed that the portion of the colter in front of the slot $e$ covers the hinge $d$, and effectually protects it from abrasion or injury while passing through the earth.

Attached to the mold-boards by the pivots $d'$ are the straps F, the upper ends of which are hinged to the side pieces, B, by the bolts $e'$. By this arrangement the rear ends of the mold-boards are efficiently supported, and so connected to the side pieces, B, as to be carried with them when they are made to approach or separate from each other in adjusting the plow to furrows of different widths, the joints or pivots by which the strap F is connected to the side pieces allowing such movement without cramping, the whole forming an implement of great utility and simplicity of construction, to take the place of more complicated and costly shovel-plows.

Having thus described my invention, I claim as new, and desire to secure by Letters Patent, the following:

1. The slotted colter D, constructed substantially as and for the purpose set forth.

2. The slotted colter D, in combination with the adjustable mold-boards E, hinged to the colter in the manner specified.

3. The colter D and adjustable mold-boards E, in combination with the pivoted straps F, adjustable side pieces, B, and beam A, all arranged and operating in the manner set forth.

In testimony that I claim the foregoing I have hereunto set my hand this 16th day of April, 1879.

OSRO A. CRAIN.

Witnesses:
W. B. JUDSON,
F. P. ALLAIRE.